US009165542B2

(12) United States Patent
Sater et al.

(10) Patent No.: US 9,165,542 B2
(45) Date of Patent: Oct. 20, 2015

(54) SYSTEM AND METHOD THAT FACILITATES CUSTOMIZING MEDIA

(75) Inventors: Neil D. Sater, Brecksville, OH (US); Mary Beth Sater, Brecksville, OH (US)

(73) Assignee: Y Indeed Consulting L.L.C., Wilmington, DE (US)

( * ) Notice: Subject to any disclaimer, the term of this patent is extended or adjusted under 35 U.S.C. 154(b) by 1672 days.

(21) Appl. No.: 11/931,580

(22) Filed: Oct. 31, 2007

(65) Prior Publication Data

US 2008/0091571 A1 Apr. 17, 2008

Related U.S. Application Data

(63) Continuation-in-part of application No. 10/376,198, filed on Feb. 26, 2003, now Pat. No. 7,301,093.

(60) Provisional application No. 60/360,256, filed on Feb. 27, 2002.

(51) Int. Cl.
*G10H 1/00* (2006.01)
*G06Q 30/06* (2012.01)
*G06Q 30/08* (2012.01)

(52) U.S. Cl.
CPC ......... *G10H 1/0058* (2013.01); *G06Q 30/0621* (2013.01); *G06Q 30/08* (2013.01); *G10H 2240/105* (2013.01); *G10H 2240/111* (2013.01)

(58) Field of Classification Search
USPC ..................................................... 705/26, 27
See application file for complete search history.

(56) References Cited

U.S. PATENT DOCUMENTS

| 5,870,700 | A | 2/1999 | Parra |
| 6,288,319 | B1 | 9/2001 | Catona |
| 6,572,381 | B1 | 6/2003 | Tsai |
| 6,678,680 | B1 | 1/2004 | Woo |
| 6,696,631 | B2 | 2/2004 | Smith et al. |
| 7,301,093 | B2 | 11/2007 | Sater et al. |
| 2001/0037465 | A1* | 11/2001 | Hart et al. ...................... 713/201 |
| 2001/0043798 | A1* | 11/2001 | Ko et al. ........................... 386/95 |

(Continued)

FOREIGN PATENT DOCUMENTS

| CA | 2290195 A1 | 5/2000 |
| DE | 29619197 B1 | 1/1997 |

(Continued)

OTHER PUBLICATIONS

Pumpadoodle, Internet Archive Wayback Machine, archive.org; www.pumpadoodle.com, Feb. 14, 2006, Aug. 11, 2006; 7pgs.*

(Continued)

*Primary Examiner* — Rob Pond

(74) *Attorney, Agent, or Firm* — Stolowitz Ford Cowger LLP

(57) ABSTRACT

The present invention relates to systems and methods for customizing media (e.g., songs, text, books, stories, video, audio . . . ) via a computer network, such as the Internet. In particular, the systems and methods provide for construction of on-line social communities where orders for customized media or representative material associated with a performer's repertoire are received, performers associated with the on-line social communities are thereafter assigned to work on the orders for customized media based on their repertoire. On completion of the customization phase by the performers assigned to work on the orders and associated with the on-line social communities, the customized media is distributed to the users who initiated the order.

44 Claims, 13 Drawing Sheets

(56) References Cited

U.S. PATENT DOCUMENTS

| | | | |
|---|---|---|---|
| 2002/0007717 | A1 | 1/2002 | Uehara |
| 2002/0029213 | A1* | 3/2002 | Borissov et al. ............. 707/7 |
| 2002/0088334 | A1 | 7/2002 | Beigi |
| 2002/0091847 | A1* | 7/2002 | Curtin ..................... 709/231 |
| 2002/0198723 | A1* | 12/2002 | Mowry ....................... 705/1 |
| 2003/0029303 | A1 | 2/2003 | Hasegawa et al. |
| 2003/0110926 | A1 | 6/2003 | Sitrick et al. |
| 2003/0182100 | A1 | 9/2003 | Plastina et al. |
| 2003/0183064 | A1 | 10/2003 | Eugene et al. |
| 2004/0031378 | A1 | 2/2004 | Hughes |
| 2004/0182225 | A1 | 9/2004 | Ellis et al. |
| 2005/0144016 | A1* | 6/2005 | Hewitt et al. ............. 704/278 |
| 2007/0038470 | A1* | 2/2007 | Nakamura et al. ............. 705/1 |
| 2007/0156507 | A1* | 7/2007 | Connelly et al. ............ 705/10 |

FOREIGN PATENT DOCUMENTS

| | | |
|---|---|---|
| JP | 09-265299 | 10/1997 |
| JP | 10-097538 | 4/1998 |
| JP | 2000-039893 | 2/2000 |
| JP | 2001-075963 | 3/2001 |
| JP | 2001-209592 | 8/2001 |
| WO | 03073235 A3 | 9/2003 |

OTHER PUBLICATIONS

EPOA dated Jan. 4, 2010 for European Patent Application No. 03 713 732.0, 4 pages.

Japanese Office Action mailed Jul. 14, 2009 for JP Application Serial No. 2003-571863, 4 Pages.

Supplemental European Search Report dated Jan. 15, 2009 for EP Application Serial No. 03 713 732.0, 2 Pages.

Japanese Office Action mailed Jan. 16, 2009 for JP Application Serial No. 2003-571863, 9 Pages.

European Office Action mailed Mar. 13, 2009 for EP Application Serial No. 03 713 732.0, 4 Pages.

Canadian OA dated May 31, 2011 for Canadian Application No. 2,477,457, 2 pages.

Japanese OA dated Aug. 5, 2011 for JP Application No. 2003-571863, 3 pages.

International Search Report dated Aug. 29, 2003 for PCT Application Serial No. PCT US03/05969.

European Office Action mailed Mar. 13, 2009 for EP Application Serial No. 03 713 732.0, 5 Pages.

Canadian OA dated Jul. 14, 2010 for Canadian Application No. 2,447,457, 4 pages.

McCord, Michael C., "Design of a Prolog-Based Machine Translation System", (date unknown), p. 350-374.

US Patent and Trademark Office, International Preliminary Report on Patentability for PCT App. No. PCT/US03/05969, dated Aug. 5, 2007, 3 pages.

European Patent Office, Examination Report for EP App. No. 03713732.0, dated Dec. 14, 2012, 6 pages.

Stolowitz Ford Cowger LLP, "Listing of Related Cases", May 8, 2013, 1 page.

* cited by examiner

SYSTEM AND METHOD THAT FACILITATES CUSTOMIZING MEDIA

CROSS-REFERENCE

This application is a continuation in part of U.S. application Ser. No. 10/376,198, filed Feb. 26, 2003, entitled SYSTEM AND METHOD THAT FACILITATES CUSTOMIZING MEDIA, which claims priority to U.S. Provisional Patent Application No. 60/360,256 filed on Feb. 27, 2002, entitled METHOD FOR CREATING CUSTOMIZED LYRICS, the disclosures of which are hereby incorporated by reference as if fully set forth herein.

TECHNICAL FIELD

The present invention relates generally to computer systems and more particularly to system(s) and method(s) that facilitate generating and distributing customized media (e.g., songs, poems, stories . . . ).

BACKGROUND

As computer networks continue to become larger and faster, so too do applications provided thereby with respect to complexity and variety. Recently, new applications have been created to permit a user to download audio files for manipulation. A user can now manipulate music tracks to customize a favorite song to specific preferences. Musicians can record tracks individually and collaborate via the Internet to produce a song, while never having met face to face. Extant song customization software programs permit users to combine multiple previously recorded music tracks to create a custom song. The user may employ pre-recorded tracks in a variety of formats, or alternatively, may record original tracks for combination with pre-recorded tracks to achieve the customized end result. Additionally, known electronic greeting cards allow users to record and add a custom audio track for delivery over the Internet.

Currently available software applications employ "Karaoke"-type recordation of song lyrics for subsequent insertion or combination with previously recorded tracks in order to customize a song. That is, a user must sing into a microphone while the song he or she wishes to customize is playing so that both the original song and the user's voice can be recorded simultaneously. Alternatively, "mixing" programs are available that permit a user to combine previously recorded tracks in an attempt to create a unique song. However, these types of recording systems can be expensive and time consuming and requires some level of skill for a user that desires rapid access to a personalized, custom recording.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for customizing media (e.g., songs, text, books, stories, video, audio . . . ) via a computer network, such as the Internet. The present invention solves a unique problem in the current art by enabling a user to alter media in order to customize the media for a particular subject or recipient. This is advantageous in that the user need not have any singing ability for example and is not required to purchase any additional peripheral computer accessories to utilize the present invention. Thus, customization of media can occur for example via recording an audio track of customized lyrics or by textual manipulation of the lyrics. In achieving this goal, the present invention utilizes client/server architecture such as is commonly used for transmitting information over a computer network such as the Internet.

More particularly, one aspect of the invention provides for receiving a version of the media, and allowing a user to manipulate the media so that it can be customized to suit an individual's needs. For example, a base media can be provided so that modification fields are embedded therein which can be populated with customized data by an individual. Once at least a subset of the fields have been populated, a system in accordance with the subject invention can generate a customized version of the media that incorporates the modification data. The customized version of the media can be generated by a human for example that reads a song or story with data fields populated therein, and sings or reads so as to create the customized version of the media which is subsequently delivered to the client. It is to be appreciated that generation of the customized media can be automated as well (e.g., via a text recognition/voice conversion system that can translate the media (including populated data fields) into an audio, video or text version thereof).

One aspect of the invention has wide applicability to various media types. For example, a video aspect of the invention can allow for providing a basic video and allowing a user to insert specific video, audio or text data therein, and a system/method in accordance with the invention can generate a customized version of the media. The subject invention is different from a home media editing system in that all a user needs to do is select a base media and provide secondary media to be incorporated into the base media, and automatically have a customized media product generated there for.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
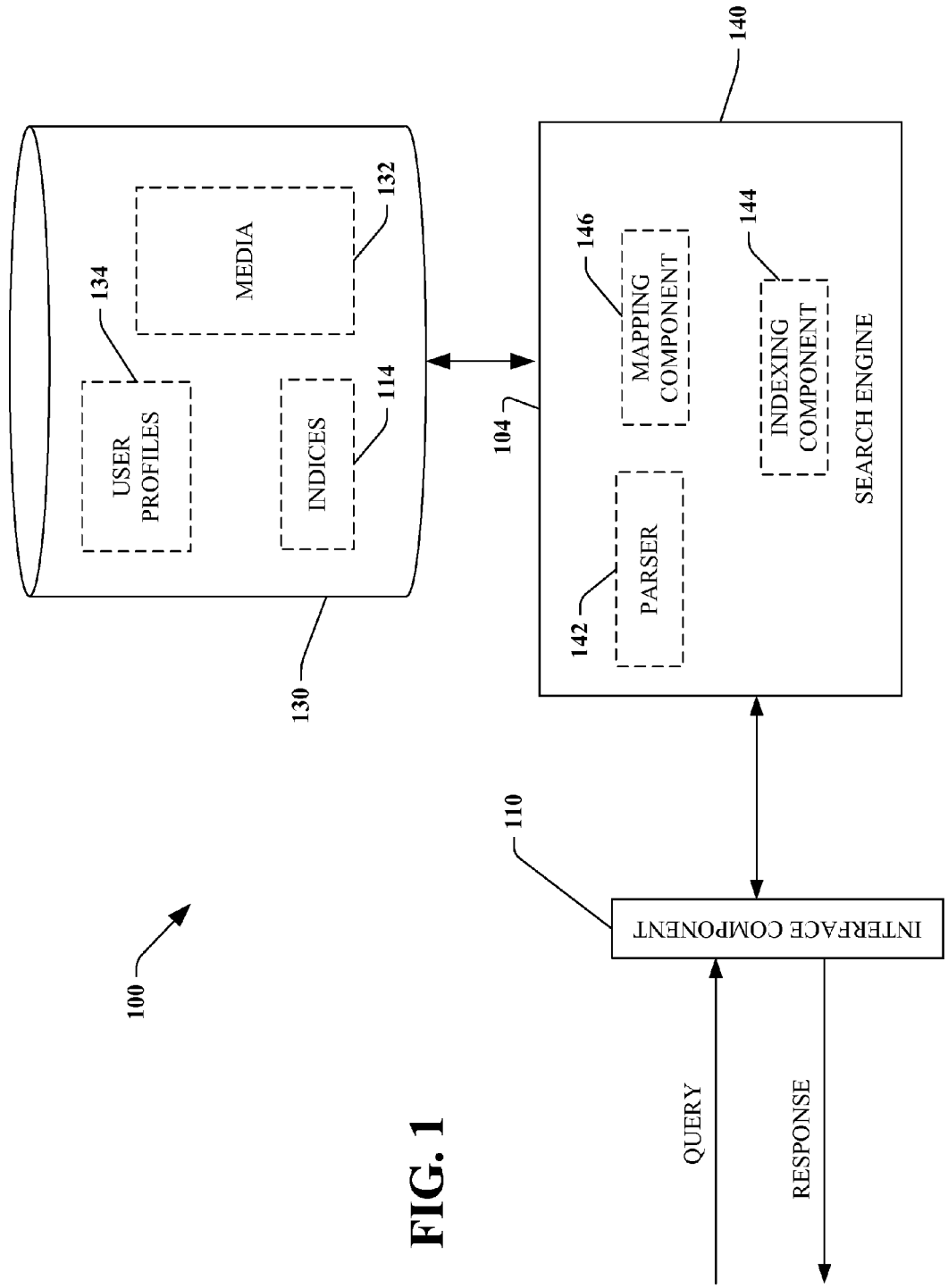
FIG. 1 is an overview of an architecture in accordance with one aspect of the present invention.

As noted above, the subject invention provides for a unique system and/or methodology to generate customized media. The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "model," "protocol," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

To provide some context for the subject invention, one specific implementation is now described—it is to be appreciated that the scope of the subject invention extends far beyond this particular embodiment. Generalized versions of songs can be presented via the invention, which may correspond, but are not limited to, special events such as holidays, birthdays, or graduations. Such songs will typically be incomplete versions of songs where phrases describing unique information such as names, events, gender, and associated pronouns remain to be added. A user is presented with a selection of samples of generalized versions of songs to be customized and/or can select from a plurality of media to be customized. The available songs can be categorized in a database (e.g., holidays/special occasions, interests, fantasy/imagination, special events, etc.) and/or accessible through a search engine. Any suitable data-structure forms (e.g., table, relational databases, XML based databases) can be employed in connection with the invention. Associated with each song sample will be brief textual descriptions of the song, and samples of the song (customized for another subject to demonstrate by example of how the song was intended to be customized) in a .wav, a compressed audio, or other suitable format to permit the user to review the base lyrics and melody of the song simply by clicking on an icon to listen to them. Based on this sampling experience, the user selects which songs he or she wants to customize.

Upon selection, in a simple form of this invention, the user can be presented with a "lyric sheet template", which displays the "base lyrics", which are non-customizable, as well as "default placeholders" for the "custom lyric fields". The two types of lyrics (base and custom fields) can be differentiated by for example font type, and/or by the fact that only the custom lyric fields are "active", resulting in a change to the mouse cursor appearance and/or resulting in the appearance of a pop-up box when the cursor passes over the active field, or some other method. The user customizes the lyrics by entering desired words into the custom lyric fields. This customization can be performed either via pull-down-box text selection or by entering the desired lyrics into the pop-up box or by any manner suitable to one skilled in the art. When allowing free-form entering, the user can be provided with recommendations of the appropriate number of syllables for that field. In some instances, portions of a song may be repeated (for example, when a chorus is repeated), or a word may be used multiple times within a song (for example, the subject's name may be referenced several times in different contexts). When this situation occurs, the customizable fields can be "linked," so that if one instance of that field is filled, all other instances are automatically filled as well, to prevent user confusion and to keep the opportunities for customization limited to what was originally intended.

In a more complex form of the invention, the user may be required to answer questions to populate the lyric sheet. For example, the user may be asked what color the subject's hair is, and the answer would be used to customize the lyrics. Once all questions are answered by the user, the lyric sheet can be presented with the customizable fields populated, based on how the user answered the questions. The user can edit this by either going back to the questions and changing the answers they provided, or alternatively, by altering the content of the field as described above in the simple form.

The first step in pre-population of the lyric template is a process called "genderization" of the lyrics. Based on the gender of the subject (as defined by the user), the appropriate selection of pronouns is inserted (e.g., "him", "he", "his", or "her", "she", "hers", etc.) in the lyric template for presentation to the user. The process of genderization simplifies the customization process for the user and reduces the odds of erroneous orders by highlighting only those few fields that can be customized with names and attributes, excluding the pronouns that must be "genderized," and by automatically applying the correctly genderized form of all pronouns in the lyrics without requiring the user to modify each one individually. A simple form of lyric genderization involves selection and presentation from a variety of standard lyric templates. If the lyrics only have to be genderized for the primary subject, then two standard files are required for use by the system: one for a boy, with he/him/his, etc. used wherever appropriate, and one for a girl, with she/her/hers, etc. used wherever appropriate. If the lyrics must be genderized for two subjects, a total of four standard files are required for use by the system (specifically, the combinations being primary subject/secondary subject as male/male, male/female, female/male, and female/female). In total, the number of files required when using this technique is equal to $2^n$, where n is the number of subjects for which the lyrics must be genderized.

Other techniques of genderizing the lyrics based on artificial intelligence can be employed. In many instances, the subject name entered by the user will be readily recognizable by the system as either masculine or feminine, and the system can genderize the song lyrics accordingly. However, where the subject's name is not clearly masculine or feminine, (for example, "Terry" or "Pat"), the system can prompt the user to enter further information regarding the gender of the subject. Upon entry of this information, the system can proceed with genderization of the song lyrics.

As the user enters information about the subject, that information can be stored in a subject profile database. The collection of this subject profile information is used to pre-populate other lyric templates to simplify the process of customizing additional songs. Artificial intelligence incorporated into the present invention can provide the user with recommendations for additional customizable fields based on information culled from a profile for example.

Upon entry, the custom lyrics are typically stored in a storage medium associated with a host computer of a network but can also be stored on a client computer from which the user enters the custom lyrics, or some other remote facility. Once customization is completed, the user is presented with a final customized lyric sheet for final approval. The lyric sheet is presented to the user for review either visually by providing the text of the lyrics; by providing an audio sample of the customized song through streaming audio, a .wav file, compressed audio, or some other suitable format, or a combination of the foregoing.

Upon final approval of all selections, customized lyric sheets can be delivered to the producer in the form of an order for creation of the custom song. The producer can have pre-recorded tracks for all base music, as well as base lyrics and background vocals. When customizing, the producer only needs to record vocals for the custom lyric fields to complete the song. Alternatively, the producer can employ artificial intelligence to digitally simulate/synthesize a human voice, requiring no new audio recording. When completed, customized songs can be distributed on physical CD or other physical media, or distributed electronically via the Internet or other computer network, as streaming audio or compressed audio files stored in standard file formats, at the user's option.

FIG. 1 illustrates a system 100 for customizing media in accordance with the subject invention. The system 100 includes an interface component 110 that provides access to the system. The interface component 110 can be a computer that is accessed by a client computer, and/or a website (hosted by a single computer or a plurality of computer), a network interface and/or any suitable system to provide access to the system remotely and/or onsite. The user can query a database 130 (having stored thereon data such as media 132) and/or profile related data 134 and other data (e.g., historical data, trends, inference related data . . . ) using a search engine 140, which processes in part the query. For example, the query can be natural language based—natural language is structured so as to match a user's natural pattern of speech. Of course, it is to be appreciated that the subject invention is applicable to many suitable types of querying schemes. The search engine 140 can include a parser 142 that parses the query into terms germane to the query and employs these terms in connection with executing an intelligible search coincident with the query. The parser can break down the query into fundamental indexable elements or atomic pairs, for example. An indexing component 144 can sort the atomic pairs (e.g., word order and/or location order) and interacts with indices 114 of searchable subject matter and terms in order to facilitate searching. The search engine 140 can also include a mapping component 146 that maps various parsed queries to corresponding items stored in the database 130.

The interface component 110 can provide a graphical user interface to the user for interacting (e.g., conducting searches, making requests, orders, view results . . . ) with the system 100. In response to a query, the system 100 will search the database for media corresponding to the parsed query. The user will be presented a plurality of media to select from. The user can select one or more media and interact with the system 100 as described herein so as to generate a request for a customized version of the media(s). The system 100 can provide for customizing the media in any of a variety of suitable manners. For example, (1) a media can be provided to the user with fields to populate; (2) a media can be provided in whole and the user allowed to manipulate the media (e.g., adding and/or removing content); (3) the system 100 can provide a generic template to be populated with personal information relating to a recipient of the customized media, and the system 100 can automatically merge such information with the media(s) en masse or serially to create customized versions of the media(s). It is to be appreciated that artificial intelligence based components (e.g., Bayesian belief networks, support vector machines, hidden Markov models, neural networks, non-linear trained systems, fuzzy logic, statistical-based and/or probabilistic-based systems, data fusion systems, etc.) can be employed to deterministically generate the customized media in a manner the system 100 in accordance with an inference as to the customized version ultimately desired by the user. In accordance with such end, historical, demographic and/or profile-type information can be employed in connection with the inference.

Figure 2:
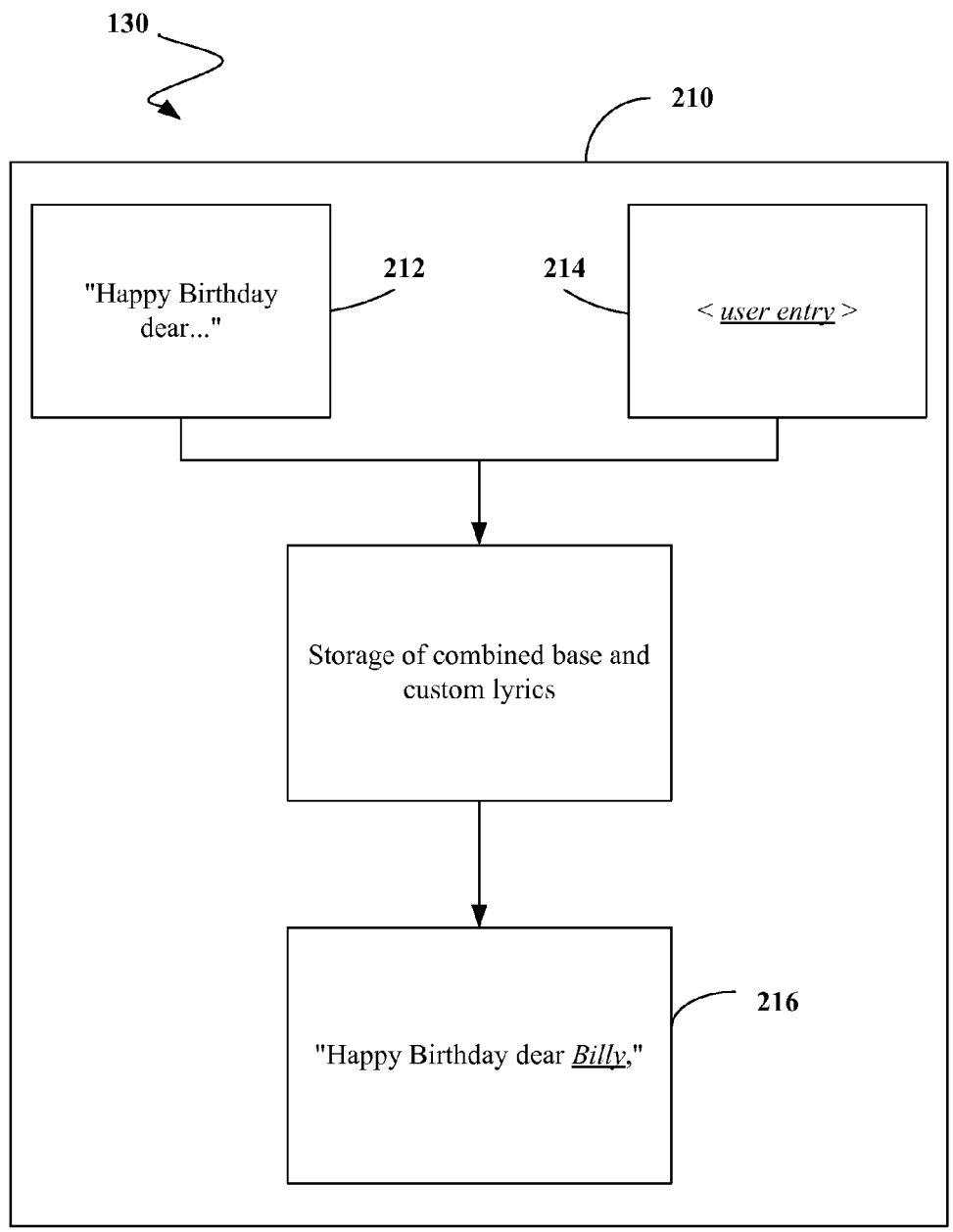
FIG. 2 illustrates an aspect of the present invention whereby a user can textually enter words to customize the lyrics of a song.

FIG. 2 illustrates an exemplary lyric sheet template that can be stored in the database 130. Upon selection of a song for customization, a user can be presented with the lyric sheet template 210, which displays non-customizable base lyrics 212 and default placeholders for custom lyric fields 214. The two types of lyrics (base and custom fields) can be differentiated by a variety of manners such as for example, field blocks, font type, and/or by the fact that only the custom lyric fields 214 are "active", resulting in a change to the mouse cursor appearance and/or resulting in the appearance of a pop-up box when the cursor passes over the active field, or any other suitable method. The user can customize the lyrics by entering desired words into the custom lyric fields 214. This customization can be performed either via pull-down-box text selection or by entering the desired lyrics into the pop-up box. When allowing free-form entering, the user can be provided with recommendations of the appropriate number of syllables for that field.

Upon entry, the custom lyrics are typically stored in a storage medium associated with the system 100 but can also be stored on a client computer from which the user enters the custom lyrics. Once customization is completed, the user is presented with a final customized lyric sheet 216 for final approval. The customized lyric sheet 216 is presented to the user for review either visually by providing the text of the lyrics; by providing an audio sample of the customized song through streaming audio, a .wav file, compressed audio, video (e.g., MPEG) or some other format, or a combination of the foregoing.

Figure 3:
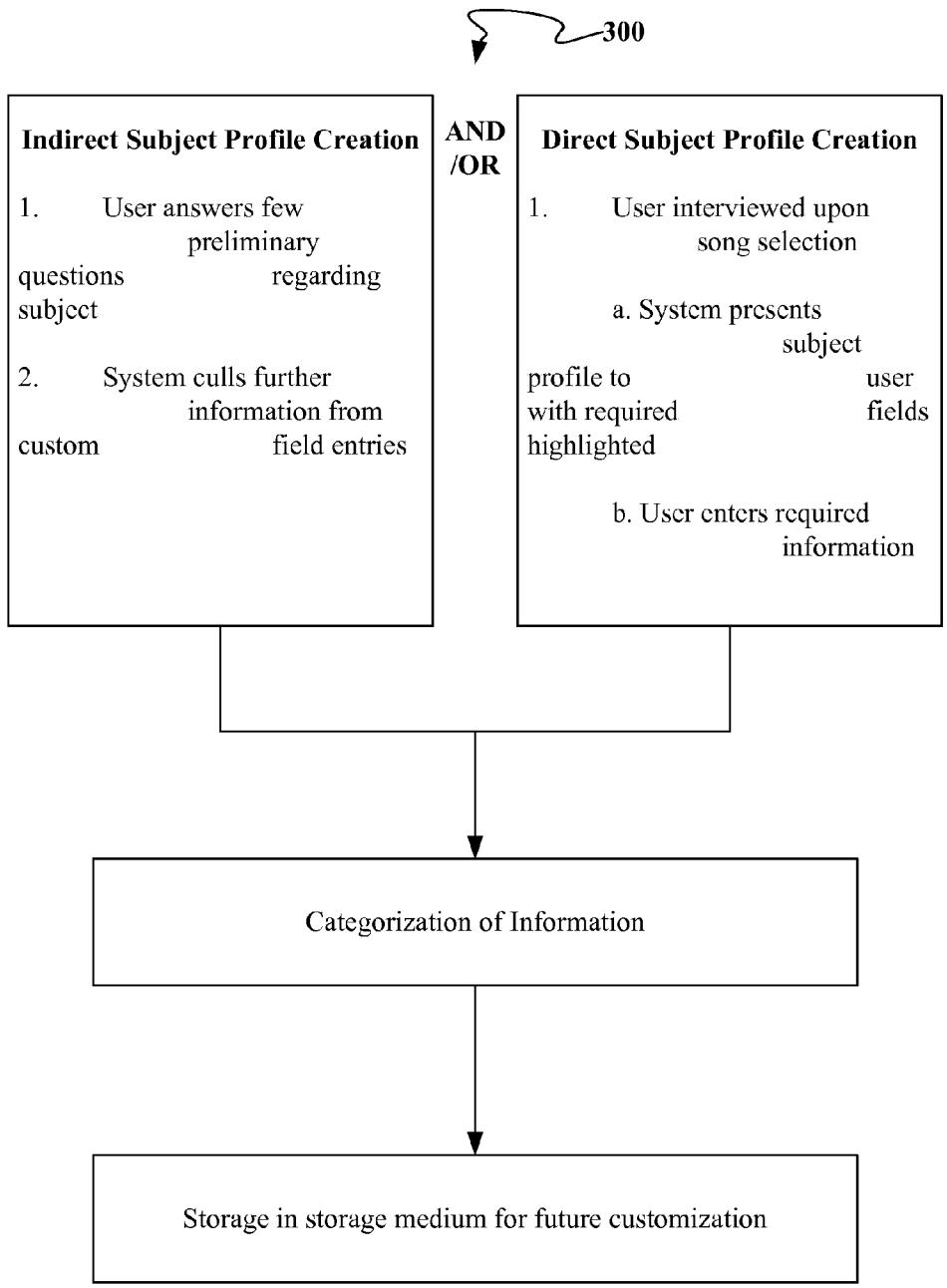
FIG. 3 illustrates the creation of a subject profile database according to an aspect of the present invention.

FIG. 3 illustrates a general overview of the creation of a profile database 300 in accordance with the subject invention. Building of the subject profile database 300 can occur either indirectly during the process of customizing a song, or directly, during an "interview" process that the user undergoes when beginning to customize a song. Alternatively, a combination of both methods of building the subject profile database 300 can be used. The direct interview may be conducted in a variety of ways including but not limited to: in the first approach, when a song is selected, the subject profile would be presented to the user with all required fields highlighted (as required for that specific song); in the second approach, only those few required questions might be asked about the subject initially. After this initial "interview", additional information about the subject would be culled and entered into the subject profile database 300, based on information the user has entered in the custom lyric fields 214 (indirect approach). All subject profile information that is collected during the customization of the song template is stored in the subject profile database 300 and used in the customization of future songs.

Figure 4:
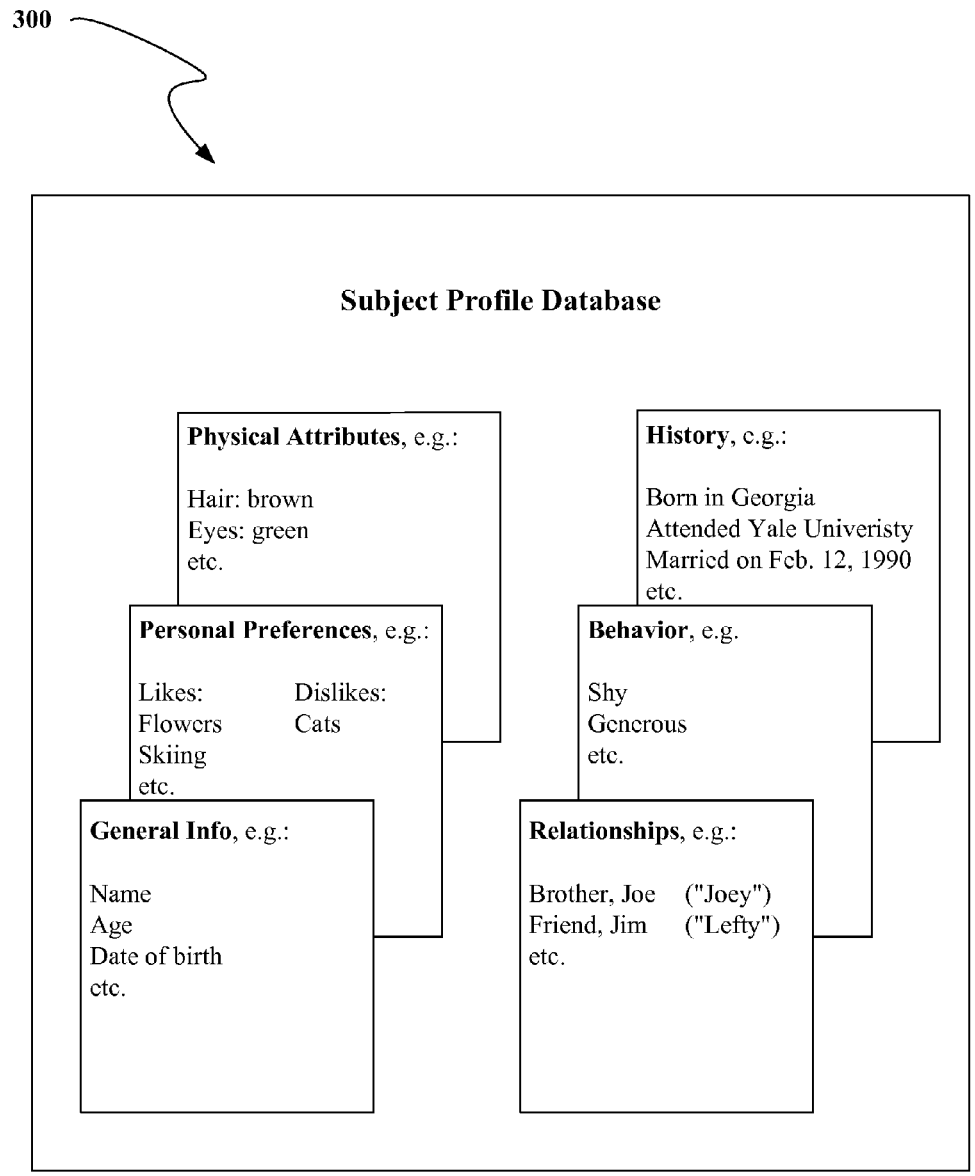
FIG. 4 illustrates an aspect of the present invention wherein information stored within the subject profile database is categorized.

According to an aspect of the present invention, information is categorized as it is stored in the subject profile database 300 (FIG. 4). For example, one category would contain general information (name, gender, date of birth, color of hair, residence street name, etc.), another category may contain information about the subject's relationships (sibling, friend, neighbor, cousin names, what the subject calls his or her mother, father, grandmothers, grandfathers, etc.). Additionally, the subject profile database 300 can contain several tiers of categories, including but not limited to a relationship category, a physical attributes category, a historical category, a behavioral category and/or a personal preferences category, etc. As subject profile database 300 grows, an artificial intelligence component in accordance with the present invention can simplify the customization process by generating appropriate suggestions regarding known information.

Figure 5:
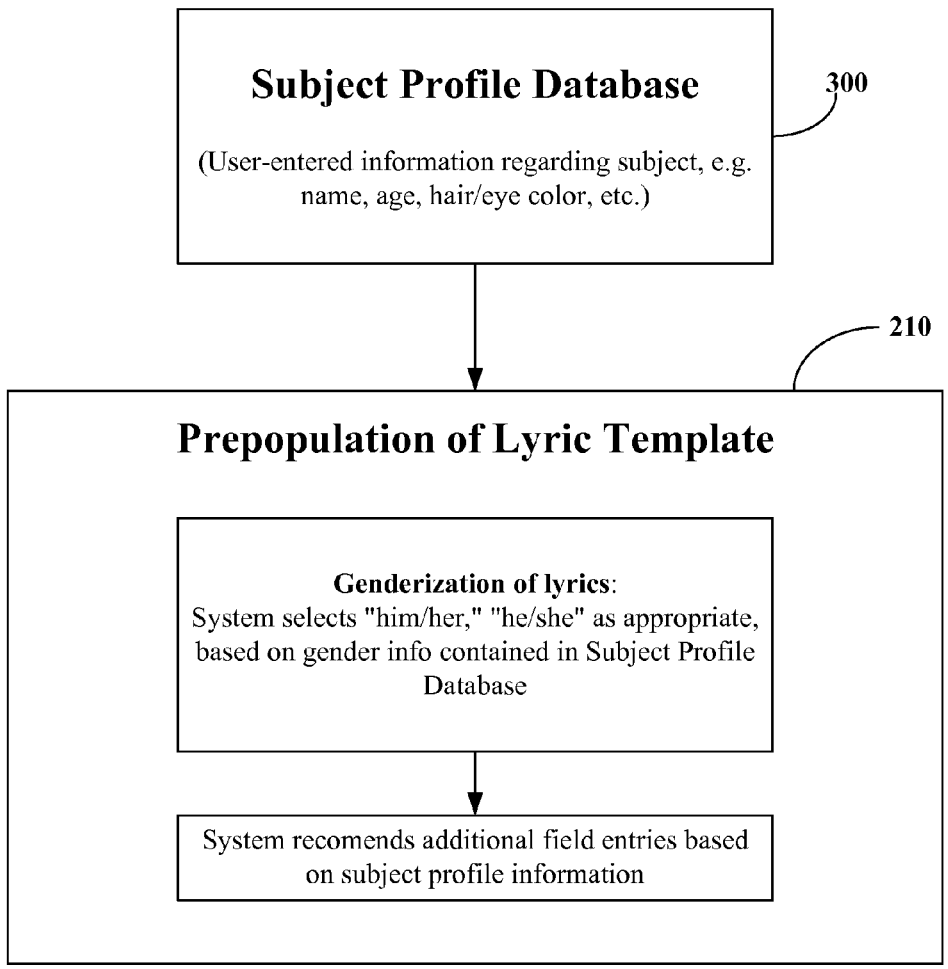
FIG. 5 illustrates an aspect of the present invention relating to pre-population of a template.

FIG. 5 illustrates an overview of the process for pre-populating lyric templates 210 via using information stored in the subject profile database 300 to "genderize" the lyrics. As the user enters information about the subject person, that information is stored in the subject profile database 300. The collection of this subject profile information is used to pre-populate other lyric sheet templates 210.

After the lyric template is genderized, additional recommendations are presented in pull-down boxes associated with the customizable fields, based on information culled from the subject profile database 300. For example, if the profile contains information that the subject has a brother named "Joe", and a friend named "Jim", the pull-down list may offer the selections "brother Joe" and "friend Jim" as recommendations for the custom lyric field 214. Artificial intelligence components in accordance with the present invention can be employed to generate such recommendations.

Figure 6:
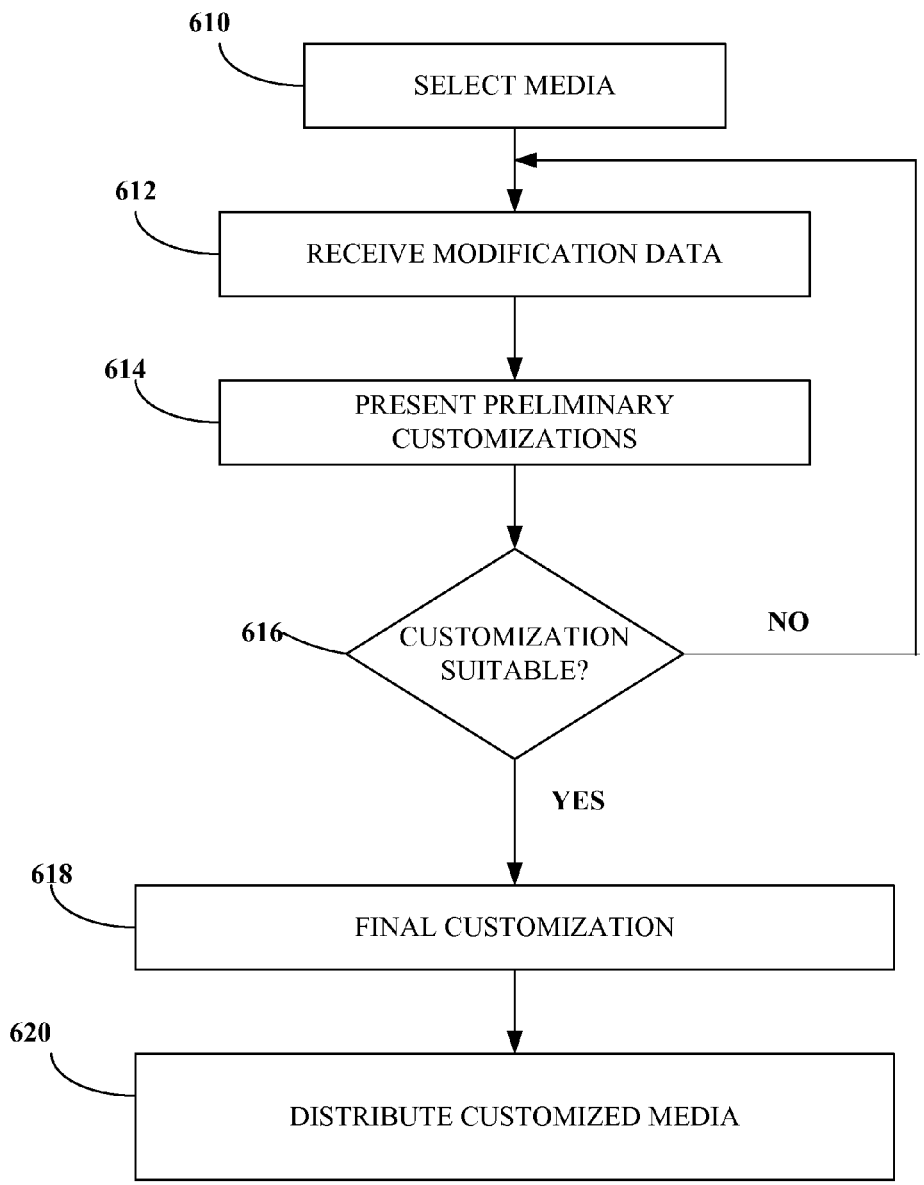
FIG. 6 is a flow diagram illustrating basic acts involved in customizing media according to an aspect of the present invention.
Figure 7:
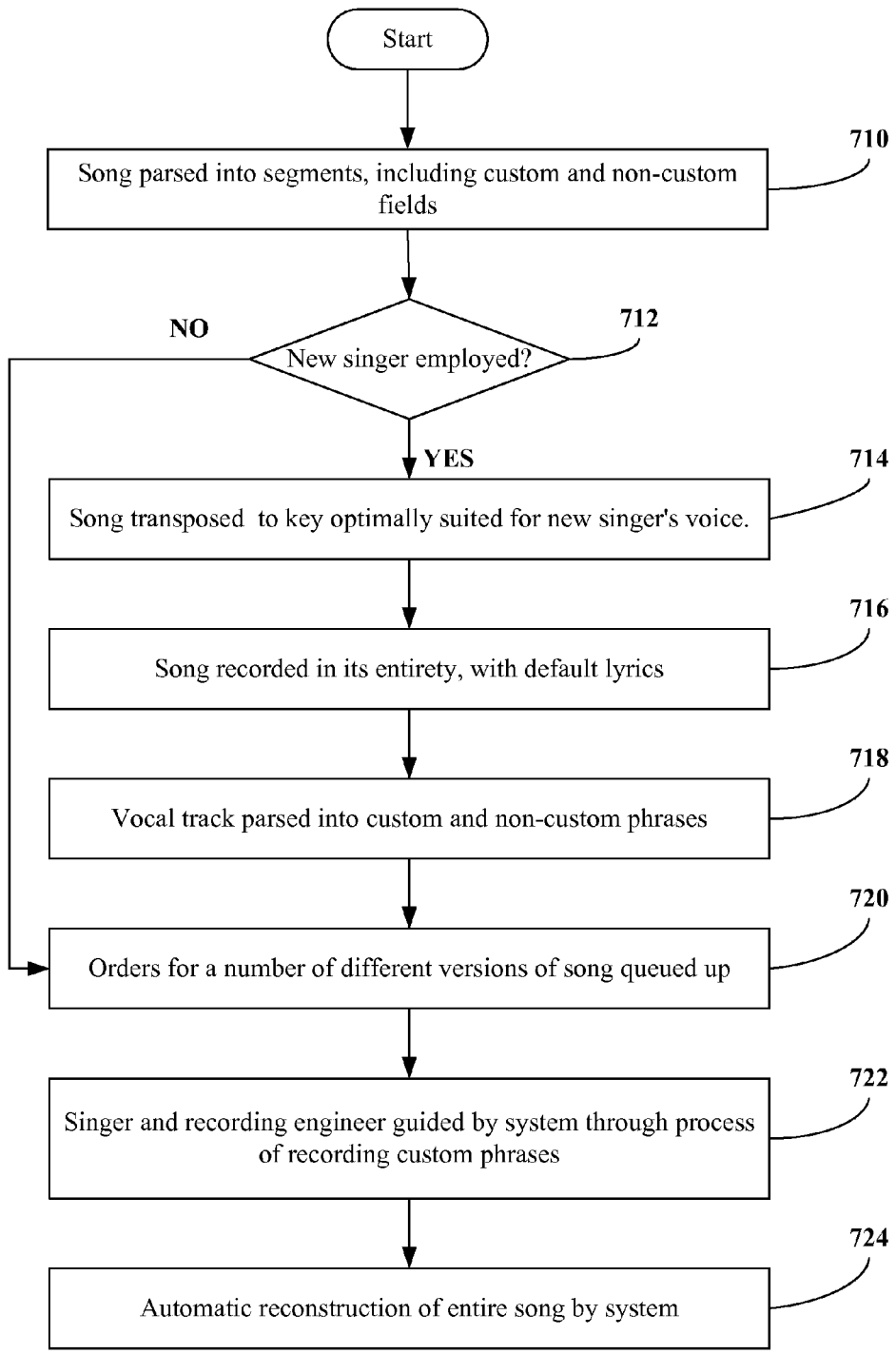
FIG. 7 is a flow diagram illustrating a systematic process of song customization and reconstruction in accordance with the subject invention.

In view of the exemplary systems shown and described above, methodologies that may be implemented in accordance with the present invention will be better appreciated with reference to the flow diagrams of FIGS. 6-7. While, for purposes of simplicity of explanation, the methodology is shown and described as a series of acts or blocks, it is to be understood and appreciated that the present invention is not limited by the order of the acts, as some acts may, in accordance with the present invention, occur in different orders and/or concurrently with other acts from that shown and described herein. Moreover, not all illustrated acts may be required to implement the methodology in accordance with the present invention. The invention can be described in the general context of computer-executable instructions, such as program modules, executed by one or more components. Generally, program modules include routines, programs, objects, data structures, etc. that perform particular tasks or implement particular abstract data types. Typically the functionality of the program modules can be combined or distributed as desired in various embodiments.

FIG. 6 shows an overview of basic acts involved in customizing media. At 610 the user selects media from a media sample database. At 612 information relating to customizing the media is received (e.g., by entering content into a data field). At 614, the user is presented with customizations made to the media. At 616 a determination is made as to the sufficiency of the customizations thus far. If suitable, the process proceeds to 618 where the media is prepared for final customization (e.g., a producer prepares media with aid of human and/or computing system—the producer can have pre-recorded tracks for base music, as well as base lyrics and background vocals). When customizing, the producer only needs to insert vocals for the custom lyric fields to complete the song. The producer can accomplish such end by employing humans, and/or computers to simulate/synthesize a human voice, including the voice in the original song, thus requiring no new audio recording, or by actually recording a professional singer's voice. If at 616 it is determined that further customization and/or edits need to be made, the process returns 612. After 618 is completed the customized media is distributed at 620 (e.g., distributed on physical mediums, or via the Internet (e-mail, downloads . . . ) or other computer network, as streaming audio or compressed data files stored in standard file formats, or by any other suitable means).

FIG. 7 illustrates general acts employed by a producer in processing a user's order. When recording customized vocals, various techniques are described to make the process more efficient (e.g., to minimize production time). At 710, a song is parsed into segments, which include both non-custom sections (e.g., phrases) and custom sections. At 712, the producer determines whether a new singer is employed: if a new singer is employed, the song is transposed to a key that is optimally suited to their voice range at 714. If no new singer is employed, then the process goes directly to act 720. At act 716, the song is recorded in its entirety, with default lyrics. At 718, a vocal track is parsed into phrases that are non-custom and custom. At 720, a group of orders for a number of different versions of the song is queued. The recording and production computer system have been programmed to intelligently guide the singer and recording engineer using a graphical interface through the process of recording the custom phrases, sequentially for each version that has been ordered, as illustrated at 722. After recording, the system automatically reconstructs each song in its entirety, piecing together the custom and non-customized phrases, and copying any repeated custom phrases as appropriate, as shown at 724. In this manner, actual recording time for each version ordered will be a fraction of the total song time, and production effort is greatly simplified, minimizing total production time and expense. In addition, even customized phrases can be pre-recorded as "semi-customized" phrases. For example, phrases that include common names, and/or fields that would naturally have a limited number of ways to customize them (such as eye or hair color) could be pre-recorded by the singer and stored for later use as needed. A database for storage of these semi-custom phrases would be automatically populated for each singer employed. As this database grows, recording time for subsequent orders would be further reduced. It should also be pointed out that an entire song does not necessarily have to be sung by the same singer. A song may be constructed in such a way that two or more voices are combined to create complementary vocal counterpoint from various vocal segments. Alternately, a song may be created using two voices that are similar in range and sound, creating one relatively seamless sounding vocal track. In one embodiment of the present invention, the gender of the singer(s) can selectable. In this embodiment, the user can be presented with the option of employing a male or female singer, or both.

Figure 8:
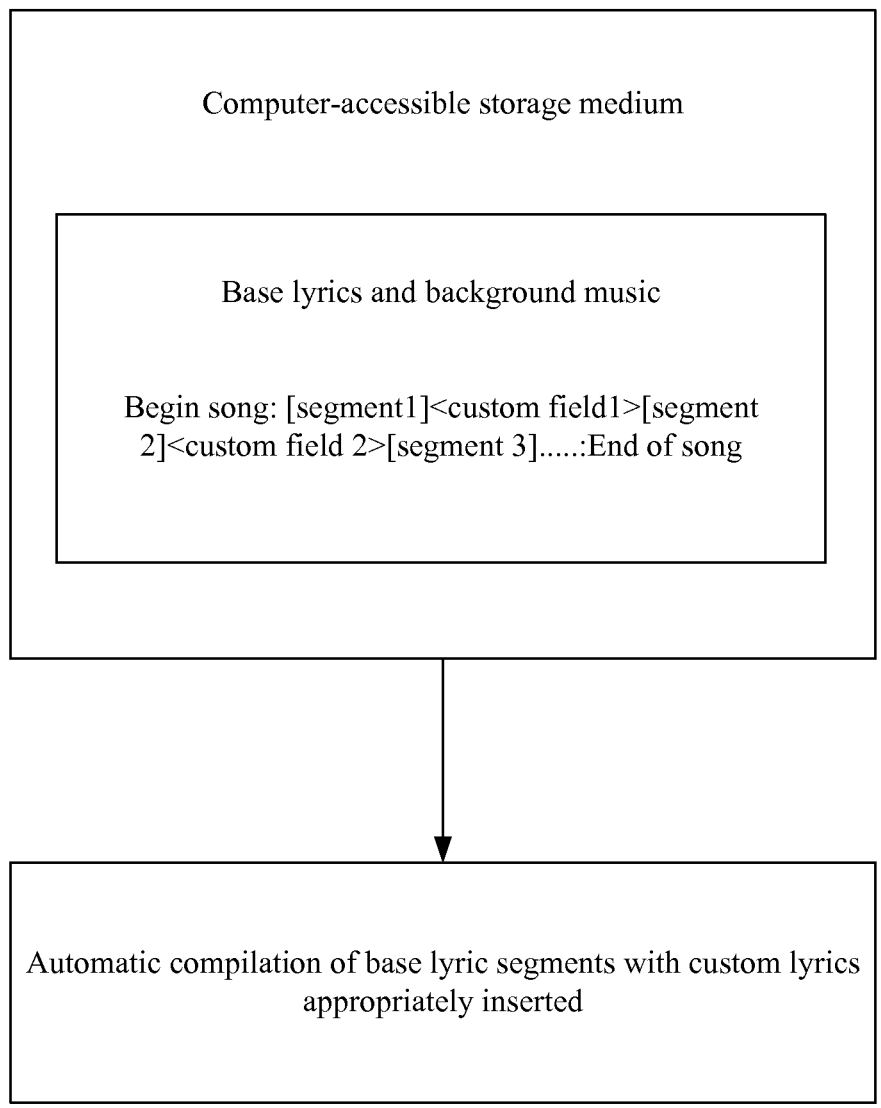
FIG. 8 illustrates an aspect of the invention wherein the customized song lyrics are stored in a manner facilitating automatic compilation of the customized song.

FIG. 8 illustrates an embodiment of the present invention in which, alternately, upon completion of the selection process, creation of the custom song may be effectuated automatically by using a computer with associated storage device, thus eliminating the need for human intervention. In such an embodiment, the base music, including the base lyrics and background voices, is digitally stored in a computer-accessible storage medium such as a relational database. The base lyrics can be stored in such a way as to facilitate the integration of the custom lyrics with the base lyrics. For example, the base lyrics may be stored as segments delimited by the custom lyric fields 214 (FIG. 2). For example, the segment of base lyrics starting with the beginning of the song and continuing to the first custom lyric field 214 (FIG. 2) is stored as segment 1. The segment of base lyrics starting with the first custom lyric field 214 (FIG. 2) and ending with the second custom lyric field 214 (FIG. 2) is next stored as segment 2. Similar storage techniques may be used for background vocals and any other part of the base music. This is continued until all of the base lyrics are stored as segments. Storage in this manner would permit the automatic compilation of the base lyric segments with the custom lyrics appropriately inserted.

As a further alternative, the base music may be separated into channels comprising the base lyrics, background vocals, and background melodies. The channels may be stored on any machine-readable medium and may have markers embedded in the channel to designate the location, if any, where the custom lyrics override the base music.

Furthermore, a technique called "syllable stretching" may be implemented to insure customized phrases have the optimum number or range of syllables, to achieve the desired rhythm when sung. This process may be performed either manually or automatically with a computer program, or some combination of both. The number (X) of syllables associated with the customized words are counted. This number is subtracted from the optimum number or range of syllables in the complete (base plus custom lyrics) phrase (Y, or Y1 thru Y2). The remainder (Z, or Z1 thru Z2) is the range of syllables required in the base lyrics for that phrase. Predetermined substitutions to the base lyrics may be selected to achieve this number. For example, the phrase "she loves Mom and Dad" has 5 syllables, whereas "she loves her Mom and Dad" has 6 syllables, "she loves Mommy and Daddy" has 7 syllables, and "she loves her Mommy and Daddy" has 8 syllables. This example illustrates how the number of syllables can be "stretched", without changing the context of the phrase. This process may be applied prior to order submission, so the user may see the exact wording that will be used, or after order submission but prior to recording and production. Artificial intelligence is employed by the present invention to recognize instances in which syllable stretching is necessary and to generate recommendations to the user or producer of the customized song.

According to one aspect of the present invention, the system is capable of recognizing the need for syllable stretching and implementing the appropriate measures to perform syllable stretching autonomously, based on an algorithm for predicting the proper insertions.

According to another aspect of the invention, the system is capable of stretching the base lyrics immediately adjacent to a given custom lyric field 214 (FIG. 2) in order to compensate for a shortage of syllables in the custom fields. Artificial intelligence incorporated into the program of the present invention will determine whether stretching the base lyrics is necessary, and to what degree the base lyrics immediately adjacent to the custom lyric field 214 (FIG. 2) should be stretched.

In another embodiment of the invention, a compilation of customized songs can be generated. When multiple customized songs are created by the user, the user will be able to arrange the customized songs in a desired order in the compilation. When compiling a custom CD, the user can be presented with a separate frame on the same screen, which shows a list of the current selections and a detailed summary of the itemized and cumulative costs. "Standard compilations" may also be offered, as opposed to fully customized compilations. For example, a "Holiday Compilation" may be offered, which may include songs for Valentine's Day, Birthday, Halloween, and Christmas. This form of bundling may be used to increase sales by encouraging the purchase of additional songs through "non-linear pricing discounts" and can simplify the user selection process as well.

Additional customization of the compilation can include images or recordings provided by the user, including but not limited to pictures, icons, or video or voice recordings. The voice recording can be a stand-alone message as a separate track, or may be embedded within a song. In one embodiment, the display of the images or video provided by the user will be synchronized with the customized song. Submission of custom voice recordings can be facilitated via a "recording drop box" or other means of real time recording. When distributing via physical CD, graphics customization of CD packaging can include image customization, accomplished via submission of image files via an "image drop box". Song titles and CD titles may be customized to reflect the subject's name and/or interests.

According to another aspect of the invention, the user is given a unique user ID and password. Using this user ID, the user has the ability to check the status of his or her order, and, when the custom song is available, the user can sample the song and download it through the web site and/or telephone network. Through this unique user ID, information about the user is collected in the form of a user profile, simplifying the task of placing future orders and enabling targeted marketing to the individual.

Figure 9:
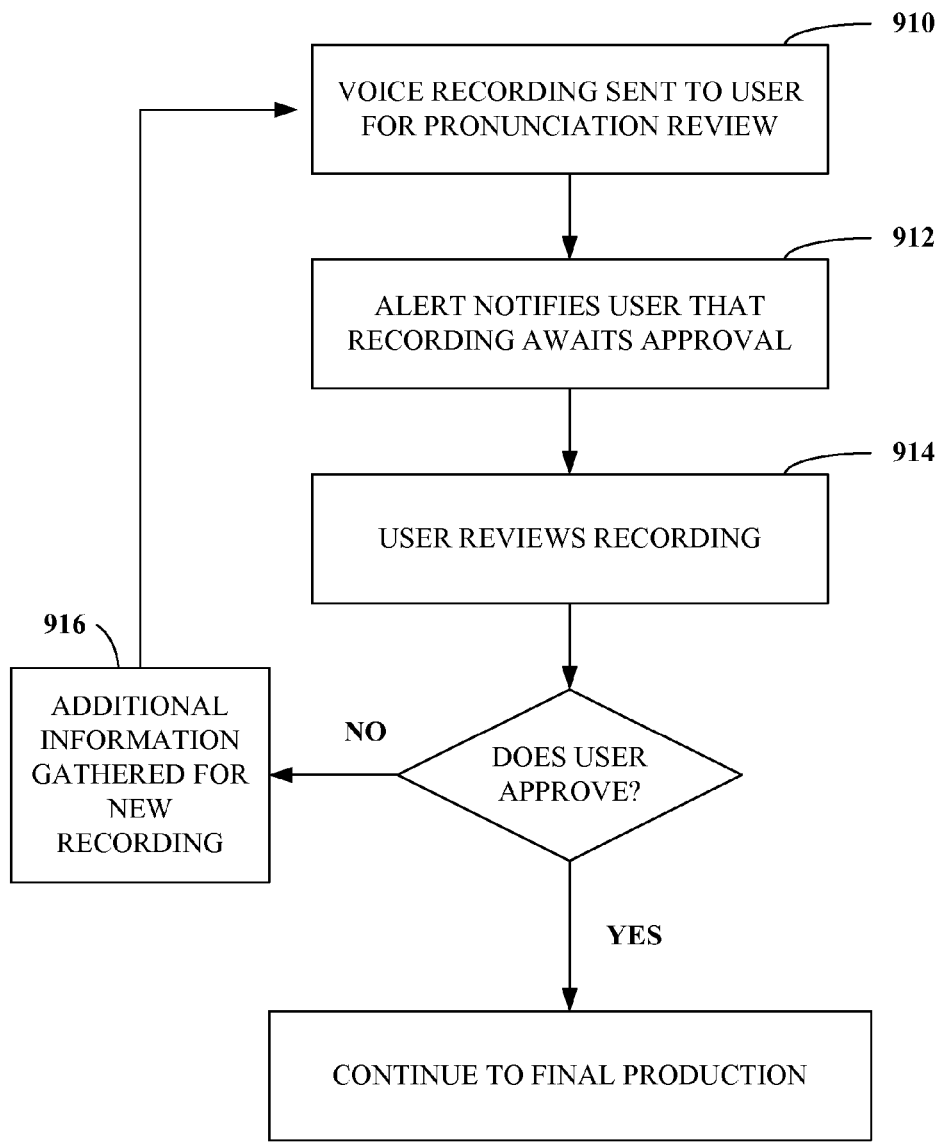
FIG. 9 is a flow diagram illustrating basic acts involved in quality verification of the customized media according to an aspect of the present invention.

Now referring to FIG. 9: A potential challenge to providing high customer satisfaction with a song customization service is the potential mispronunciation of names. To resolve this problem, one or a combination of several means are provided to permit the user to review the pronunciation for accuracy prior to production and/or finalization of the customized song. After submitting a valid order, a voice recording may be created and made available to the user to review the pronunciation in step 910. These voice recordings are made available through the web site, and an associated alert is sent to the user telling them that the clips are available for their review in step 912. Said voice recordings can also be delivered to the user via e-mail or other means utilizing a computer or telephone network, simplifying the task for the user. The user then checks them at 914 and, if they are correct, approves. Approval can take multiple forms, including telephone touchtone approval, email approval, website checkbox, instant messaging, short messaging service, etc. If one or more pronunciation is incorrect, additional information is gathered at 916, and another attempt is made. These processes are implemented in such a way that the number of acts and amount of communication required between the user and the producer is minimized to reduce cost, customer frustration, and production lead-time. To accomplish this the user is issued instructions on the process at the time of order placement. Electronic alerts are proactively sent to the user at each act of the process when the user is expected to take action before finalization, production and/or delivery can proceed (such as reviewing a recording and approving for production). Reminders are automatically sent if the user does not take the required action within a certain time frame. These alerts and reminders can be in the form of emails, phone messages, web messages posted on the web site and viewable by the recognized user, short messaging services, instant messaging, etc.

An alternative approach to verifying accurate phonetic pronunciation involves use of the telephone as a complement to computer networks. After submitting a valid order, the user is given instructions to call a toll free number, and is prompted for an order number associated with the user's order. Once connected, the automated phone system prompts the user to pronounce each name sequentially. The prompting sequence will match the text provided in the user's order confirmation, allowing the user to follow along with the instructions provided with the order confirmation. The automated phone service records the voice recording and stores it in the database, making it available to the producer at production time.

Other approaches encompassed by alternate embodiments of the present invention include offering the user a utility for text-based phonetic pronunciation, or transferring an applet that facilitates recording on the user's system and transferring of the sound files into a digital drop box. Text-to-voice technology may be used as a variation on this approach by providing an applet or other means to the user that allows them to "phonetically construct" each word on their local client device; once the word is properly constructed to the user's satisfaction, the applet transfers "instructions" for reconstruction via the computer network to the producer, whose system recreates the pronunciation based on those instructions.

Yet another embodiment involves carrying through with production, but before delivering the finished product, requiring user verification by posting or transferring a low-quality or incomplete version of the musical audio file that is sufficient for pronunciation verification but not complete, and/or not of high enough audio quality that it would be generally acceptable to the user. Files may be posted or transferred electronically over a computer network, or delivered via the telephone network. Only after user verifies accurate phonetic pronunciation and approves would the finished product be delivered in its entirety and in full audio quality.

In many cases phonetic pronunciation of all names would be easily determined, making any quality assurance step unnecessary, so the user may be given the option of opting out of this step. If the user does not choose to invoke this quality assurance step, he or she will be asked to approve a disclaimer acknowledging that he or she assumes the risk of incorrect mispronunciation.

Alternatively, the producer may opt out of the quality assurance process rather than the user. When the producer reviews an order, he or she can, in his or her judgment, determine whether or not the phonetic pronunciation is clear and correct. If pronunciation is not clear, the producer may invoke any of the previously mentioned quality assurance processes before proceeding with production of the order. If pronunciation is deemed obvious, the producer may determine that invoking a quality assurance process is not necessary, and may proceed with order production. The benefit of this scenario is the reduction of potentially unnecessary communication between the user and the producer. It should be noted that these processes are not necessarily mutually exclusive from one another; two or more may be used in combination with one another to optimize customer satisfaction.

According to another aspect of the present invention, administration functionality may be designed into the system to facilitate non-technical administration of public-facing content, referred to as "content programming". This functionality would be implemented through additional computer hardware and/or software, to allow musicians or content managers to alter or upload available lyric templates, song descriptions, and audio samples, without having to "hard program" these changes. Tags are used to facilitate identifying the nature of the content. For example, the system might be programmed to automatically identify words enclosed by "(parenthesis)" to be customizable lyric fields, and as such, will be displayed to the user differently, while words enclosed by "{brackets}" might be used to identify words that will be automatically genderized.

Figure 10:
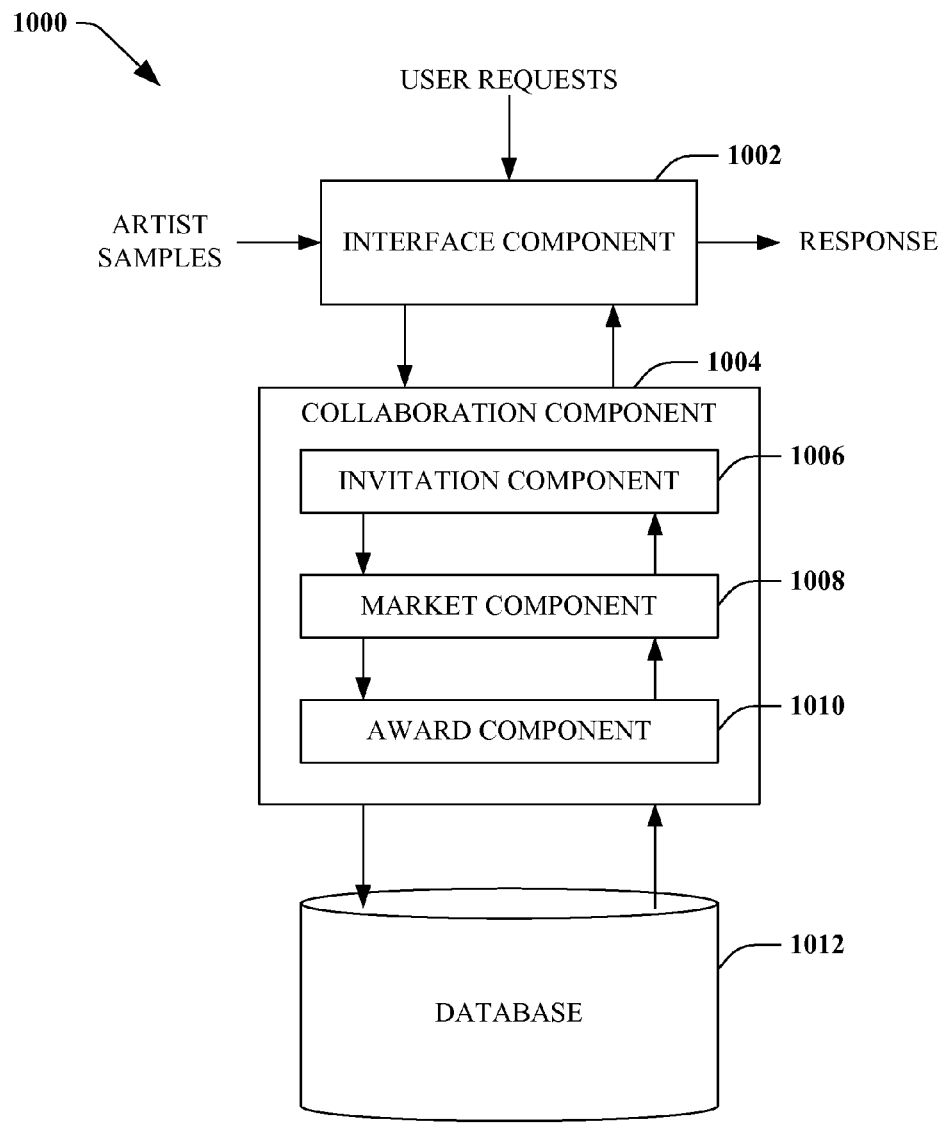
FIG. 10 depicts a system that effectuates and facilitates construction of an on-line social community of recording artists who can serve as artistic contributors to the established community in accordance with an aspect of the claimed subject matter.

In accordance with a further illustrative aspect of the claimed subject matter, and in light of the proliferation of low cost home studio recording hardware, many performers (e.g., singers, songwriters, instrumentalists, authors, artists, and the like) now have the ability to record in their own homes. Accordingly, FIG. 10 depicts a system 1000 that effectuates and facilitates construction of an on-line social community of recording artists who can serve as artistic contributors to the established community. A community once established can allow for rapid order fulfillment of customized media, the ability to fulfill a large number of orders, a diverse variety of available performer talent, and the ability to minimize production costs, through a labor bidding process. System 1000 can include interface component 1002 that can have functionality similar to that described in relation to FIG. 1 (e.g., 110). Thus, because much of the configuration and operation of interface component 1002 is substantially similar to that described with respect to interface component 110 (e.g., FIG. 1), a detailed description of such features has been omitted for the sake of brevity. Nevertheless, interface component 1002 as illustrated, in addition to those attributes associated with interface component 110, can receive user requests in the form of orders for customized media (e.g., songs, poems, stories, soundtracks, and the like). Additionally, 1002 can also receive artist/performer samples (e.g., representative material illustrative of an artist/performer's repertoire, cost quotes, delivery lead-times, etc.) that can be utilized by system 1000 to allocate or assign performers to undertake fulfillment of orders received for customized media based at least in part on which performer can provide the best combination of quality, cost, workload, and delivery lead-time, for example.

System 1000 can also include collaboration component 1004 that can receive input from interface component 1002 related to orders for customized media as well as artist/performer samples. Collaboration component 1004 can utilize artist/performer samples to determine whether or not a particular artist/performer should become an "approved contributor" for a particular order, such as, for instance, a particular song, story, or poem based at least in part on the submitted artist/performer samples and recording capabilities for the particular song, story, or poem. Because different performers/artists can have different vocal styles and ranges, a performer/artist typically may need to become independently approved for each order for which they are interested in recording, for example. When collaboration component 1004 receives artist/performer samples (e.g., representative material, quotes, delivery lead-times, and the like) and/or user requests for customized media, collaboration component 1004, through utilization of market component 1008 can initiate bidding processes where artists/performers who have been, or are contemporaneously, approved contributors for a song (e.g., based at least in part on vocal styles, genre, ranges, . . . ) can be invited to participate in the bidding process. Invitations to partake in the bidding process can be effectuated by invitation component 1006. Collaboration component 1004, as will be appreciated by those conversant in this field of endeavor, can aggregate multiple orders into lots or a manageable number of work-orders being bid to justify the artists/performers setup time and to allow for economies of scale. Moreover, collaboration component 1004 in conjunction with database 1012 can allow artists/performers to establish rules for bids and respective delivery times (e.g., ranges of delivery times) that each artist/performer is willing to commit to, so that they need not respond in real time to each and every quote request. When the bidding process terminates (e.g., collaboration component 1004 can include timers and can set time periods for the bidding process) collaboration component 1004, through use of award component 1010 can compare quotes and provide recommendations on how to assign or allocate the work. Award component 1010 can base such recommendations, allocations, or assignments at least in part on price quotes as well as an artist's quality of previous work (e.g., judged by producers and/or customers), history of on-time delivery performance, and other relevant scores (e.g., scores that reflect how consistently reliable a particular artist is, and how easy he/she is to work with). By applying these factors in the recommendation/selection process, the work need not be assigned or allocated solely based on lowest price quotes, but can typically favor artists/performers that deliver quality work and have a proven track record of reliability and meeting their deadlines. Additionally, weightings can be utilized for each factor utilized in the recommendation/selection process, such weightings can be periodically adjusted (e.g., manually, dynamically, or automatically) to improve the recommendation/selection process. Weightings can also be utilized periodically (e.g., based on overall order volume at a given point in time, and other risk factors) to favor new artists and give them a chance to "break in" and be assigned work, despite the fact that they may not have an established track record or provenance with system 1000. In addition, to assure delivery lead-times, the recommendation/selection process effectuated by collaboration component 1004 can identify backup performers/artists who can be assigned or allocated the work on a standby basis, if the chosen, selected, or recommended artist declines, fails to, or in is unable, to meet the delivery deadline, or desists from completing the work prior to the deadline.

Collaboration component 1004 can further categorize or classify a portion or subset of "approved contributors" as "house contributors". House contributors can be those artists/performers who meet certain criteria in advance (e.g., achieving a track record of quality, dependability, or timeliness) and make certain commitments (e.g., with regard to predetermined, fixed turnaround time, and/or costs to fill orders). When orders are placed, the purchaser/user can be given the option to have vocalists automatically assigned for them, or they can pay an extra fee for the right to select the vocalists themselves. In the latter case, recommendation/selection can be made from the "house artists" available for that particular piece of work. House artists/performers can have the ability to schedule temporary "out of office periods", during which they are not offered for selection/recommendation, due to vacations or heavy workloads. Additionally, collaboration component 1004 can throttle the number offerings of a particular artist/performer based at least in part on how heavily booked the artist/performers become. Moreover, collaboration component 1004 can throttle the number of offerings based on the historical frequency of an artist/performer's selection (e.g., so a particular artist/performer is not offered to too many users at any point in time), how many orders the artist/performer currently has open, or the artist/performer's previous track record on how well he/she manages their workload, for example. Such a mechanism can factor in input from the artist/performers on how heavy of a workload they are comfortable taking on at a given point in time.

Collaboration component 1004 can also associate a "popularity rating" with house artists. Such popularity ratings can be presented to users who have chosen to select their own vocalists/performers or other artistic contributors rather than having them dynamically allocated or assigned, for example. The popularity rating can be used as a factor for users when selecting artists/performers, and can be accompanied with "popularity reviews" that previous customers have written. Popularity ratings and reviews can be accompanied by "critic ratings" and "critic reviews" that can be derived from one or more music professionals, for instance.

When work is assigned, the artist/performer can start with base (e.g., un-customized) media in a lowered quality form. In the context where the form of media is customizable songs, for example, the base media can be music that is recorded at a low bit rate, and/or uses simplified instrumentation that is less musically pleasing than the original, and/or inserts audio "watermarks" periodically, which can render the recording undesirable, for example. Use of low-quality forms of base media typically would discourage unauthorized content generation, for instance, artists/performers attempting to create recordings that are not authorized.

The base media can be recordings of the songs without lead vocals, in a standard format such as WAV, and although they are delivered in a low-quality form to discourage piracy, they can still be kept at the same tempo. These low-quality base media files can be provided through the online community network to the artist/performer (e.g., upon becoming an approved contributor for a particular song/piece of work) whereupon the artist/performer can load the low-quality base media files into their home recording system for further processing. Alternatively and/or additionally, the low-quality base media files can be automatically loaded to the particular artist/performers recording system, such loading can be instigated and/or effectuated by award component 1010, for example. When the artist/performer is assigned or allocated the task of filling an order, the artist/performer can also receive customized lyrics for the order from award component 1010, at which point the artist/performer can create a track of vocal recording using the customized lyrics, delivering back a high quality vocal recording in a standard format, such as, for example, WAV. Typically however, the recorded vocals would not be mixed with any base music.

The delivery of the recorded vocals can be through FTP, peer-to-peer networking, emailing of the content, or uploading to a website, for instance. An engineer who receives the vocal recording can then review the received recorded vocals, and if satisfactory, accept it, and enter the artist/performer's on-time delivery and other scores in the system.

The engineer can then commence work on the final production and engineering phase which can involve combining customized WAV recordings with a high quality form of the base media in recording software, aligning the vocal tracks with background music through visual inspection of audio files, and the like. To allow for easy visual alignment of the audio files, the artist/performer's base media file can contain a "count-in" click series for several beats (e.g., the number can be dependent on the time signature of the song) prior to the start of the song, and the artist/performer generally would record a cue in the vocal track to facilitate alignment. For example, the vocalist can enunciate "bop" simultaneously with a certain number of the last in the series of clicks. The corresponding clicks on the background music that the engineer is able to view, and the recording of the word "bop" can then be visually aligned, and because the base media the artist used and the engineer used are recorded at the same tempo, the balance of the recording should be aligned throughout the song. Once aligned and merged, this initial portion of the vocal track containing the words "bop", and the clicks in the background track can then be deleted from the audio file as part of the final editing process, where other edits can be made, and chorus and reverb and other effects applied. The completed song can then be stored and/or made available for further steps of mastering process, for example.

In an alternative aspect, instead of allowing members of the online community to use their own recording system and exchanging content in universal formats, home recording software utilized by artist/performers can be integrated into a custom client-based software program that can be downloadable by the artist/performer and automatically, or on demand, installed on the artist/performer's computer, to remotely manage the recording process. This aspect can provide a number of advantages: first, the systems and methods associated with FIG. 7, intended to make the recording process more efficient, can be implemented consistently for all artists in the provided client program. Second, the client-based software package can incorporate content protection encryption so that while the recording tracks can be played to the monitors to facilitate recording, the stored files would be encrypted and protected, so that they cannot be played back later unless the user is authorized with an encryption key and/or the appropriate content rights. This approach typically can allow the artist/performer to work with actual background music rather than a low quality and/or "watermarked" version of it. Additionally, to further prevent piracy by the online community, the software program can play back the recordings in shortened clips (e.g., 30 second maximum increments). When reviewing the song for final editing, the artist can play these shortened clips successively, with a slight pause between them, and with short "pre-roll" and "post-roll" added to each clip, providing overlap, and allowing thorough review of those sections of the recording that fall on or near the clip boundaries. This system and method can therefore help eliminate the piracy "analog hole", where pirates re-record media that is being played in real time to a playback device. Third, the task associated with aligning the vocal track to the underlying background music would generally be unnecessary with this aspect, because the recording would typically be done with the original base background music, therefore simplifying the final editing and engineering effort. A fourth advantage of this illustrative aspect can be that the transfer of the recording can be managed automatically by the computer system, once the artist/performers decide the recording is complete, eliminating the need to train the online community on how to manage that process.

With respect to the online community, artist/performers can include instrumental musicians who contribute new instrumental tracks to songs, and/or who provide song variations/improvements. The community can also include songwriters, who bid on a "work for hire" basis to compose lyrics and/or music based on pre-selected topics. Song-writers typically have limited instrumentation skills, so when they generate recordings of their compositions, they often use tools such as synthesizers, midi sequencers, software "band in a box" programs, percussion loops/machines, etc., to create recordings of the songs, including all the "instruments" used in the arrangements. While these recordings can sound acceptable to a musically untrained ear, they can be dramatically improved by replacing some or all of the instrument tracks with tracks recorded by real musicians playing real instruments (e.g., rather than synthesizers, midi sequencers, and the like). The online community can be applied to allow this sort of collaborative improvement. For example, a producer can assign a task of composing a song to a songwriter, who can then deliver a recording of the finished product, with some or all instrumentation tracks synthesized, sequenced, and/or computer generated. The songwriter can also deliver music scores, tabs, midi sequence files, chord progressions, and/or other forms of documentation, which a producer can then provide to other musicians, who can use them to re-record particular instrumentation tracks for the song, which, when inserted into the original song through recording software, replacing the previous instrumentation track, can improve aspects of the finished product. As such, a producer can produce a song through virtual collaboration between songwriter(s) and musicians who never directly interact with one another.

The online artistic community can also include a sub-community of "content advisors", who serve to direct and oversee the artistic production processes on behalf of the organization, approve or reject content contributions, provide ratings and critical reviews of the content and artists, assign "parental ratings" to content (e.g., so that content deemed unacceptable for young or conservative users can be screened out for such users), and approve or reject artist's designation as "approved contributors".

By establishing a vast pool of contributing artists and advisors, an unlimited number of songs and variations of songs can be made available to users. As will be appreciated, selection of songs can become very challenging with such a large library of content. Rather than requiring the user to sift through an unmanageable number of songs, a "song suggestion system" can suggest a limited number of songs to the purchaser, in sorted order of relevancy. To facilitate and effectuate song selection, content tags can be suggested by the artist community and/or content advisors, and tag approval can be performed by content advisors. In addition, as new songs are added to the portfolio, they can be profiled demographically, to define attributes of which potential subjects fit song topics and the lyrics used. For example, some songs can be more suitable for younger children instead of older children, for boys instead of girls, and for active boys instead of more passive boys. A search system can allow users to enter keywords to search through the tags, helping to identify song topics, while also allowing users to profile attributes of the subjects. The system can apply algorithms that identify and offer the user a limited number of customizable songs that best match the subject's interests, personality, and/or demographic profile, by comparing information the user provides with the content tags of songs, and the song's demographic profile. Additional sorting can be achieved by considering other factors such as user ratings and song popularity (frequency of ordering), for instance.

In accordance with one aspect of the claimed subject matter a sub-community of "free-lance" artist/performers can be formed within the online community. This sub-community can develop completely original content and set their own prices for work, taking advantage of the established brand, network, and operational infrastructure the organization offers, as a means of offering their skills to an established community of customers.

In accordance with a further aspect of the claimed subject matter artist "competitions" can be set up within the online community, where one or more artists submit their song compositions and/or lyrics, and/or versions of songs, instrumentations, arrangements, and/or vocal recordings, and the online community is provided the ability to listen to and/or view the samples, and vote for their preferences.

Figure 11:
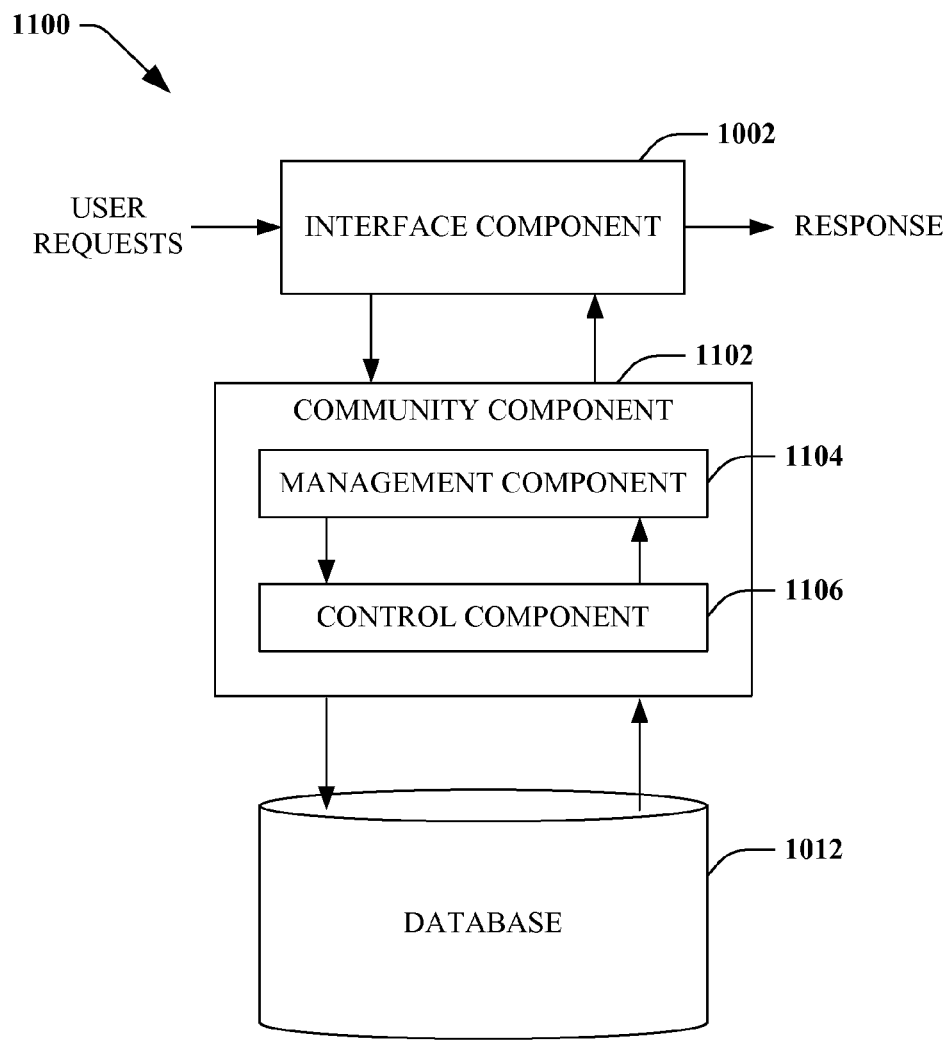
FIG. 11 illustrates a system that effectuates and facilitates construction of an on-line social community in accordance with one aspect of the claimed subject matter.

FIG. 11 provides illustration of a system 1100 that effectuates and facilitates construction of an on-line social community in accordance with one aspect of the claimed subject matter. System 1100 can include interface component 1002 the functionality of which can be similar to that described supra, wherein interface component 1002 receives or elicits user requests for creation of customized media and thereafter provides responses based at least in part on user requests solicited or received.

Creation of customized media can form the basis of an online "user community", for actual and prospective subjects of the customized media and their friends and family. Accordingly, system 1100 can include community component 1102 that can effectuate construction of an online user community wherein actual and/or prospective subjects for customized media and their friends and family can be linked together for communication and collaboration. Each form of customized media ordered can be associated in database 1012 with a specific subject. For example, in the case of children's songs, a song ordered for Johnny can result in Johnny becoming a new potential member of the community. Similarly, songs ordered for a combination of Johnny and Sally can result in creation of records for both Johnny and Sally in database 1012. Once these records are created in database 1012, the child or the child's parent can activate the record, making the child an official member of the community. In addition, people who are not song subjects can proactively choose to join the community themselves, so they can interact with other members of the community. Examples of people who might do so can be friends and relatives of the subjects (and therefore would like to interact with the subjects and review the content associated with the subjects), children who would like to have songs created for them in the future (e.g., who would be provided with a "gift registry function", where they can identify the songs they desire and provide information about themselves that would be used to customize the media), and musicians who are members of the "artist community" (e.g., who can share personal information about themselves and their skills, and share details of their recording experience, so the subjects and others in the community can know about them and the process behind the creation of their songs).

Community component 1102 can include management component 1104 that can administer the online community (e.g., user community, artist/performer community, and the like) as well as manage orders for customized media so that as order management status is updated, the content associated with the subject in the user community is updated automatically. For example, when the lyrics are created, the posting of the lyrics by the creator can be linked to the subject's profile, for review by others. When a vocalist is assigned the task of creating the song, a link to their profile would be added, so the subject and his/her friends and family can learn about the artist/performer who will be singing the song. When a song is recorded and final engineering is completed, the song can be uploaded into an archive (e.g., database 1012), and can be made available on the user's profile for others to listen to, as a streamed service, for instance. A commerce engine can also be linked or affiliated with management component 1104, enabling users to purchase electronic and/or additional physical copies of the customized media.

In accordance with one aspect of the claimed subject matter, users directly involved in the purchase of customized media (such as the purchaser, the subject, and the subject's parent) can be given the ability to grade the artists. For instance, the purchaser can rate the performance of the vocalist used to record the song. Database 1012 can then be employed to log these user ratings, and that user input can be used to derive an overall "popularity rating" of that particular performer singing that particular song; one of the factors that can be employed in the selection of artists for future orders together with the producer's ratings, for example.

In a further aspect of the claimed subject matter, users can collaborate in the customization process (e.g., through utilization of collaboration component 1002 and/or community component 1102), by selecting a song for a particular subject, and inviting others to participate in the entering of song customization information. This capability can allow multiple community members to work together to define the content for a song. Such an aspect can keep track of entries suggested in each field by each user, and users would have the ability to review all the suggestions. Eventually, one of the participants can choose to select this song to purchase and have it created for the subject. For example, the participant who selected the song to purchase can add the song to their shopping cart, but nevertheless the system typically can retain the record of song information suggestions, and at some point in the purchasing process or after purchase, the purchaser can be requested to make final decisions on the information they want to submit for customization, prior to "locking in" the song information and commencing the creation phase.

Moreover, users can be offered the option of creating fully custom songs for premium prices wherein the users can define topics and pre-defined quantity of customization fields. The resulting songs can then be added as a standard portfolio offering, available for further customization to future purchasers. Additionally, users can also be given the option to select the vocalist, or can delegate this option to someone else. For example, a grandmother may purchase a song, and choose to pay an extra fee for the right to select the vocalist, but defer the selection of the vocalist to another user (e.g., a child subject). Similarly, can decide to buy a certain number of songs, but can defer the selection of which songs to another user (e.g., the subject or the subject's guardian).

In yet a further aspect the claimed subject matter the work assignment or allocation bidding processes discussed supra can be extended to include order bidding processes for order placement. Such a facility can be included with the functionality of community component 1102 and can be particularly useful when users request fully custom songs. For example, users can request a full custom song, which can then be offered to a "free-lance" artist/performer community included in the online community totality, to select who will create the song. An iterative bidding process can then automatically negotiate between how much the purchaser is willing to pay, and how low the lowest bidding artist is willing to create the song for, for instance. Starting bid points can be set to assure that the order will be accepted and the work will be completed, with the starting bid points determined based at least in part on whether the order can be expected to be profitable for both the user receiving the order and the artist creating the song.

Additionally, through use of community component 1102 users can be offered the opportunity to rate the library of available songs (e.g., typically persisted in database 1012), to write "popularity reviews" of the artist/performers who contributed to their recordings, provide suggestions for improvements to the media (e.g., songs and/or lyrics), to suggest and/or vote on new song topics, to rate and/or vote for different versions of the songs (e.g., to determine desirability of proposed variations based at least in part on recent artist/performer contributions), to request songs to be added to their personal "gift registry", to upload additional media into their profiles, such as photographs, videos, and/or audio files, and to send messages to others in the online community.

Additionally, community component 1102 can include control component 1106 that can provide the ability to screen out content deemed unacceptable for children and/or conservative users. Users can adjust varying levels of control which can be used to progressively screen out content based at least in part on ratings that can have been assigned for the content.

Figure 12:
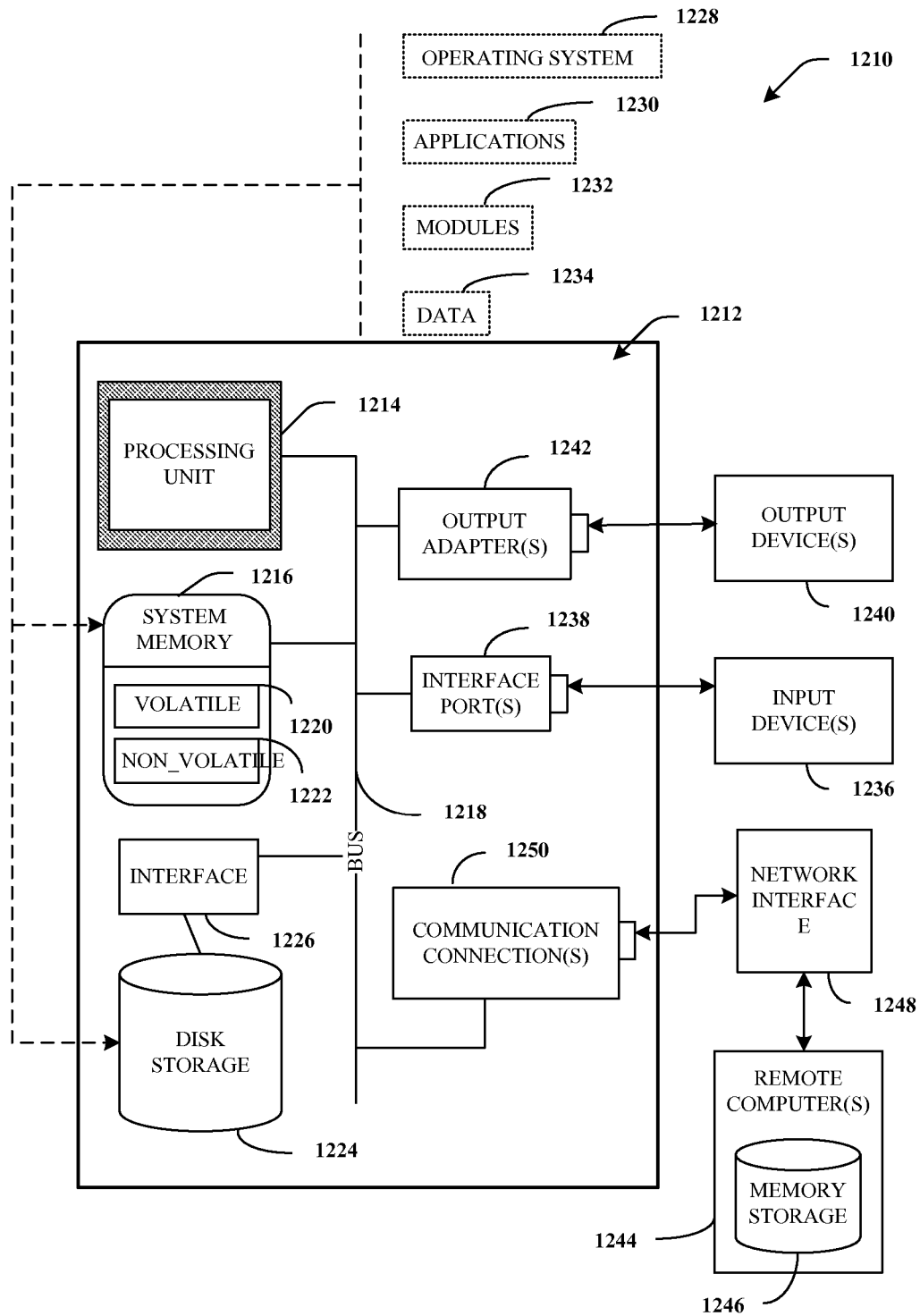
FIG. 12 illustrates an exemplary operating environment in which the present invention may function.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 15-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE, Token Ring/IEEE and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

It is to be appreciated that the functionality of the present invention can be implemented using JAVA, XML or any other suitable programming language. The present invention can be implemented using any similar suitable language that may evolve from or be modeled on currently existing programming languages. Furthermore, the program of the present invention can be implemented as a stand-alone application, as web page-embedded applet, or by any other suitable means.

Additionally, one skilled in the art will appreciate that this invention may be practiced on computer networks alone or in conjunction with other means for submitting information for customization of lyrics including but not limited to kiosks for submitting vocalizations or customized lyrics, facsimile or mail submissions and voice telephone networks. Furthermore, the invention may be practiced by providing all of the above-described functionality on a single stand-alone computer, rather than as part of a computer network.

Figure 13:
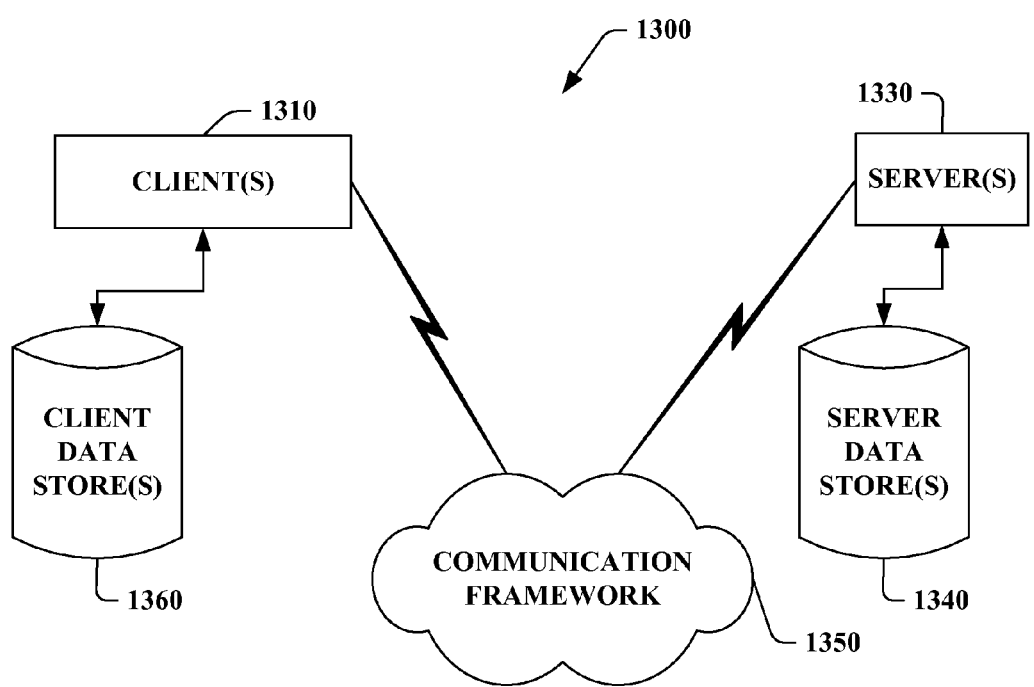
FIG. 13 is a schematic block diagram of a sample computing environment with which the present invention can interact.

FIG. 13 is a schematic block diagram of a sample computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
   retrieving an order for customized media;
   assigning a performer to the order;
   deriving a tempo-aligned first digital media of a first bit rate from a second digital media having a second bit rate that is different than the first bit rate;
   enabling the tempo-aligned first digital media to be delivered to a remote first electronic recording system corresponding to the assigned performer;
   receiving a recording of a third bit rate in response to enabling the tempo-aligned first digital media of the first bit rate to be delivered to the remote recording system;
   mixing, by a second electronic recording system that is different than the remote first electronic recording system, the second digital media of the second bit rate and content of the recording of the third bit rate;
   generating the customized media responsive to the mixing; and
   transmitting the customized media over an electronic network or storing the customized media in a memory device.

2. The method of claim 1, wherein the assignment of the performer is based on representative information associated with the performer or a user selection of the performer.

3. The method of claim 1, wherein the transmitted or stored customized media includes populated data fields embedded in transmitted or stored customized media.

4. The method of claim 2, further comprising:
   initiating a labor bidding process based on at least one of: the order or the representative information; and
   associating the order and the performer based on the labor bidding process.

5. The method of claim 2, wherein the representative information comprises at least one of the following: a popularity rating associated with the performer, a rating of previous work by the performer, a history of on-time delivery, a performance sample, a repertoire, a cost quote, a delivery lead-time, a vocal style, a vocal range, a price range or a musical genre.

6. The method of claim 2, wherein the assigning is further based on at least one of: a schedule or a work load indicator included in the representative information associated with the performer.

7. The method of claim 1, further comprising:
   guiding modification of the content to generate customized content; and
   reconstructing the customizable media to combine the customized content and non-customized content.

8. The method of claim 1, further comprising identifying rules for a labor bidding process wherein the rules include weighting one or more factors associated with an outcome in the labor bidding process.

9. The method of claim 1, further comprising initiating a bidding process to pair a different performer and the order based at least in part on different representative material associated with the different performer and a price quote, wherein the different performer is to be assigned the order if the performer is unable to undertake the order.

10. The method of claim 1, further comprising associating a popularity rating with the performer, wherein the popularity rating is based on a user assessment of the customized media created by the performer.

11. The method of claim 1, further comprising including a count in click series in the second digital media prior to deriving the tempo-aligned first digital media of the first bit rate from the second digital media.

12. The method of claim 11, wherein the mixing further comprises:
   locating a cue in the recording; and aligning the cue with a click of the count in click series of the second digital media; and wherein the method further comprises:

deleting the count in click series and the cue from the customized media.

13. The method of claim 1, further comprising suggesting one or more different customizable media to a user based on information in a user profile database.

14. The method of claim 1, further comprising publishing information corresponding to the customized media on a social networking website wherein authorized users are granted access to modify the order for the customized media or granted access to the customizable media, or any combinations thereof.

15. A system comprising:

means for soliciting an order for customized media;

means for assigning a performer to the order based on the representative information;

means for enabling a first digital media of a first bit rate to be delivered to a remote first electronic recording system corresponding to the assigned performer, wherein the digital media of the first bit rate is derived from a second digital media having a second bit rate that is different than the first bit rate and tempo-aligned with respect to the second digital media;

means for mixing, by a second electronic recording system that is different than the remote first electronic recording system, content of a recording of a third bit rate received after enabling the delivery and the second digital media; and means for transmitting customized media generated responsive to the mixing over an electronic network or storing the customized media in a memory device.

16. The system of claim 15, wherein the transmitted or stored customized media includes populated data fields embedded in transmitted or stored customized media.

17. The system of claim 15, further comprising means for classifying the performer based on the representative information and means for associating the performer and a user based on a classification.

18. The system of claim 15, further comprising means for initiating a bidding process wherein the performer and the order for customized media are paired based on a price quote included with the representative information.

19. The system of claim 15, further comprising:

means for initiating a labor bidding process based on at least one of: the order or the representative information; and means for associating the order and the performer based on the labor bidding process.

20. The system of claim 15, wherein the representative information comprises at least one of the following: a popularity rating associated with the performer, a rating of previous work by the performer, a history of on-time delivery, a performance sample, a repertoire, a cost quote, a delivery lead-time, a vocal style, a vocal range, a price range or a musical genre.

21. The system of claim 15, wherein the means for assigning is further based on at least one of: a schedule or a work load indicator included in the representative information associated with the performer.

22. The system of claim 15, further comprising:

means for guiding modification of the content to generate customized content; and means for reconstructing the customizable media to combine the customized content and non-customized content.

23. The system of claim 15, further comprising means for identifying rules for a labor bidding process wherein the rules include weighting one or more factors associated with an outcome in the labor bidding process.

24. The system of claim 15, further comprising means for initiating a bidding process to pair a different performer and the order based at least in part on different representative material associated with the different performer and a price quote, wherein the different performer is to be assigned the order if the performer is unable to undertake the order.

25. The system of claim 15, further comprising means for associating a popularity rating with the performer, wherein the popularity rating is based on a user assessment of the customized media created by the performer.

26. The system of claim 15, wherein the third bit rate is different than the first bit rate.

27. The system of claim 26, wherein the third bit rate corresponds to a quality level of the second bit rate.

28. The system of claim 15, wherein the means for soliciting the order includes means for suggesting the customized media to a user based on information in a user profile database.

29. The system of claim 15, further comprising a means for publishing information corresponding to the customized media on a social networking website wherein authorized users are granted access to modify the order for the customized media or granted access to the customizable media.

30. A computer-readable memory device having instructions stored thereon that, in response to execution by a processing device, cause the processing device to perform operations comprising:

soliciting an order for customized media;

assigning a performer to the order based on the representative information;

enabling a first digital media of a first bit rate to be delivered to a remote first electronic recording system corresponding to the assigned performer, wherein the digital media for the first bit rate is derived from a second digital media having a second bit rate that is different than the first bit rate and tempo-aligned with respect to the second digital media;

receiving a recording of a third bit rate in response to enabling the first digital media of the first bit rate to be delivered to the remote first electronic recording system;

mixing, by a second electronic recording system that is different than the remote first electronic recording system, content of the recording and the second digital media of the second bit rate;

generating the customized media responsive to the mixing; and transmitting the customized media over an electronic network or storing the customized media in a memory device.

31. The computer-readable memory device of claim 30, wherein the transmitted or stored customized media includes populated data fields embedded in transmitted or stored customized media.

32. The computer-readable memory device of claim 30, wherein the operations further comprise classifying the performer based on the representative information and associating the performer and a user based on a classification.

33. The computer-readable memory device of claim 30, wherein the operations further comprise initiating a bidding process wherein the performer and the order for customized media are paired based on a price quote included with the representative information.

34. The computer-readable memory device of claim 30, wherein the operations further comprise:
  initiating a labor bidding process based on at least one of: the order or the representative information; and
  associating the order and the performer based on the labor bidding process.

35. The computer-readable memory device of claim 30, wherein the representative information comprises at least one of the following: a popularity rating associated with the performer, a rating of previous work by the performer, a history of on-time delivery, a performance sample, a repertoire, a cost quote, a delivery lead-time, a vocal style, a vocal range, a price range or a musical genre.

36. The computer-readable memory device of claim 30, wherein the assigning is further based on at least one of: a schedule or a work load indicator included in the representative information associated with the performer.

37. The computer-readable memory device of claim 30, wherein the operations further comprise:
  guiding modification of the content to generate customized content; and
  reconstructing the customizable media to combine the customized content and non-customized content.

38. The computer-readable memory device of claim 30, wherein the operations further comprise identifying rules for a labor bidding process wherein the rules include weighting one or more factors associated with an outcome in the labor bidding process.

39. The computer-readable memory device of claim 30, wherein the operations further comprise initiating a bidding process to pair a different performer and the order based at least in part on different representative material associated with the different performer and a price quote, wherein the different performer is to be assigned the order if the performer is unable to undertake the order.

40. The computer-readable memory device of claim 30, wherein the operations further comprise associating a popularity rating with the performer, wherein the popularity rating is based on a user assessment of the customized media created by the performer.

41. The computer-readable memory device of claim 30, wherein the operations further comprise causing a first count in click series to be included in the first digital media of the first bit rate.

42. The computer-readable memory device of claim 41, wherein the mixing further comprises:
  locating a cue in the recording; and
  aligning the cue with a click of a count in click series of the second digital media; and
  wherein the operations further comprise deleting the count in click series from the customized media.

43. The computer-readable memory device of claim 30, wherein the operations further comprise suggesting the customized media to a user based on information in a user profile database.

44. The computer-readable memory device of claim 30, wherein the operations further comprise publishing information corresponding to the customized media on a social networking website wherein authorized users are granted access to modify the order for the customized media or granted access to the customizable media.

* * * * *